Oct. 4, 1938.  M. NEEDLER  2,132,314
LAWN SPRINKLER
Filed May 18, 1937  3 Sheets-Sheet 1

Marley Needler, INVENTOR
BY Victor J. Evans & Co.
ATTORNEYS

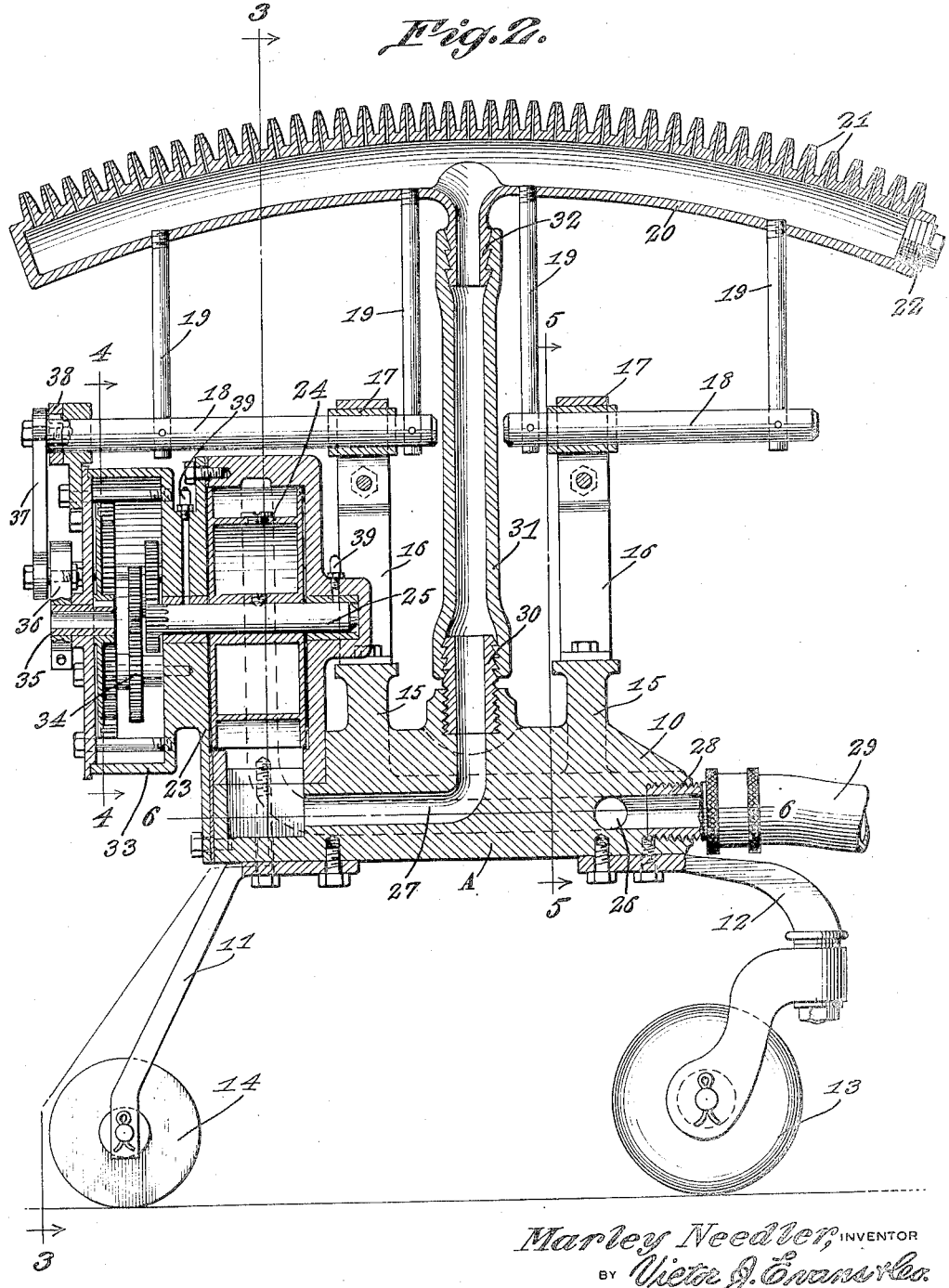

Oct. 4, 1938.                M. NEEDLER                2,132,314
                            LAWN SPRINKLER
                         Filed May 18, 1937           3 Sheets-Sheet 3
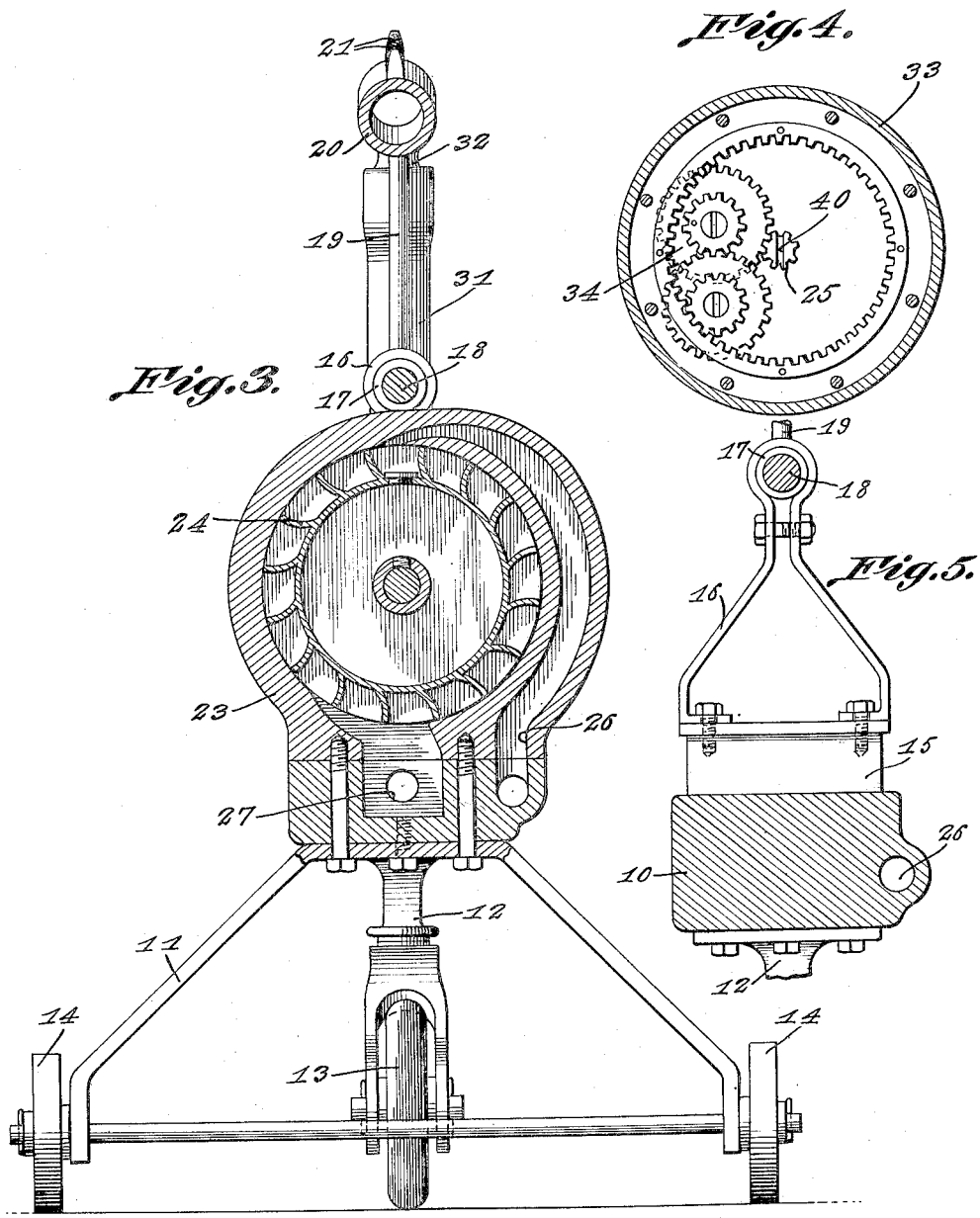
Marley Needler, INVENTOR
BY Victor J. Evans & Co.
ATTORNEYS Patented Oct. 4, 1938

2,132,314

UNITED STATES PATENT OFFICE 2,132,314

LAWN SPRINKLER

Marley Needler, Muskegon, Mich.

Application May 18, 1937, Serial No. 143,371

1 Claim. (Cl. 299—67)

The invention relates to a lawn sprinkler and more especially to an automatic water sprinkler for use on lawns.

The primary object of the invention is the provision of a device of this character, wherein through the use of a water motor motion will be imparted to a sprinkler head so as to give swinging strokes thereto and in this manner enabling the sprinkling of water for a considerable distance or over a relatively wide area, the sprinkler being of novel construction.

Another object of the invention is the provision of a sprinkler of this character, wherein when the water hose is disconnected therefrom the sprinkler head can be adjusted so that it may be conveniently used as a handle for the carrying of the sprinkler from one point to another or the placing of the same in storage when not in use.

A further object of the invention is the provision of a sprinkler of this character, wherein a wheeled carriage supports the sprinkler head so that when the sprinkler is upon a lawn it can be shifted from one point to another and when the sprinkler is operating it will have a wide range of spraying activity and in this manner expediting the sprinkling of a lawn, the sprinkler being automatically operating.

A further object of the invention is the provision of a sprinkler of this character, which is simple in construction, reliable and effective in operation, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claim hereunto appended.

In the accompanying drawings:

Figure 2 is an enlarged sectional view taken on the line 2—2 of Figure 1 looking in the direction of the arrows.

Figure 3 is a sectional view on the line 3—3 of Figure 2 looking in the direction of the arrows.

Figure 4 is a sectional view on the line 4—4 of Figure 2 looking in the direction of the arrows.

Figure 5 is a fragmentary sectional view taken on the line 5—5 of Figure 2 looking in the direction of the arrows.

Similar reference characters indicate corresponding parts throughout the several views in the drawings.

Figure 1:
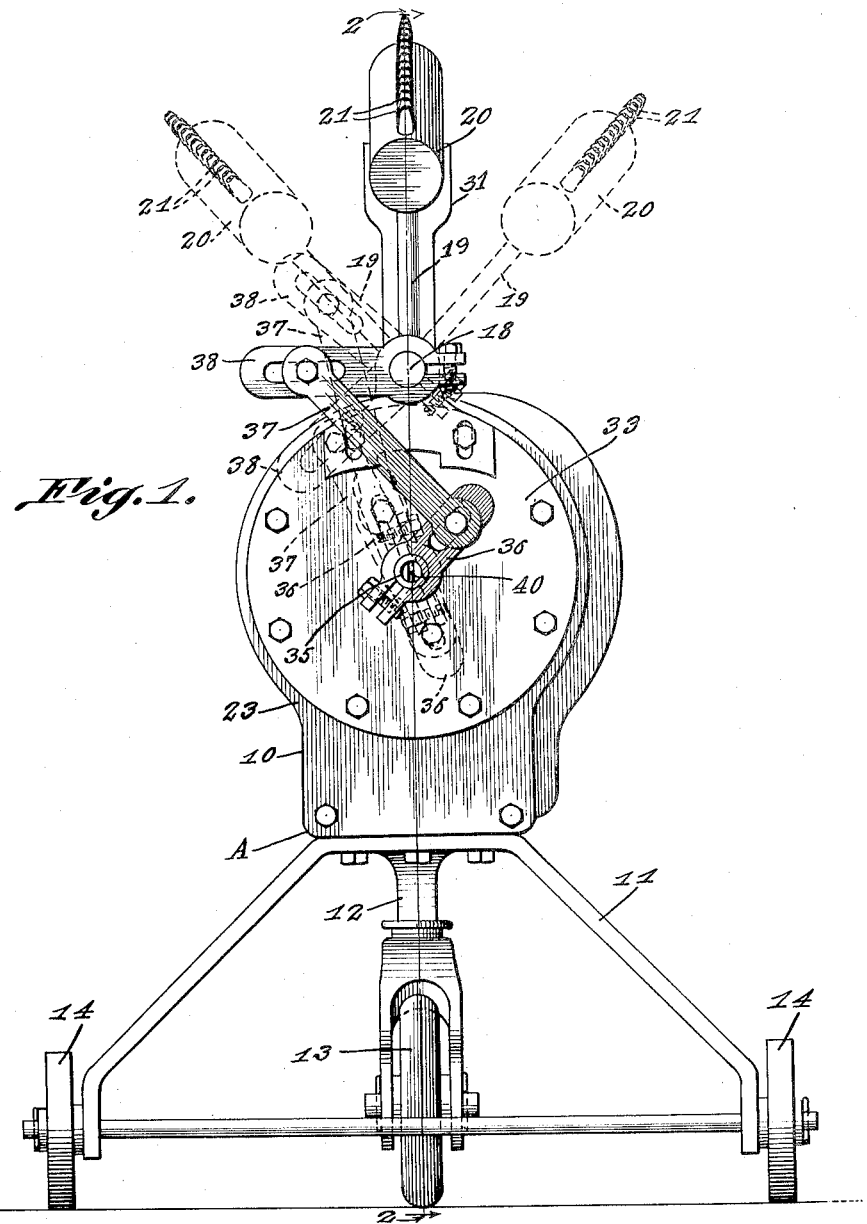
Figure 1 is an elevation of the sprinkler constructed in accordance with the invention.
Figure 6:
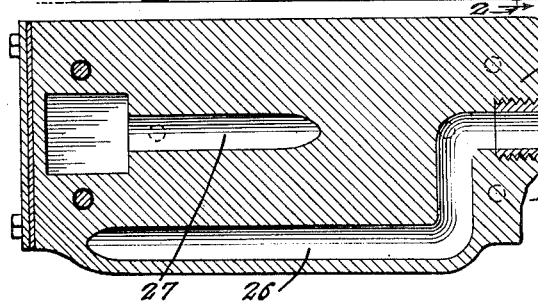
Figure 6 is a fragmentary sectional view taken on the line 6—6 of Figure 2.

Referring to the drawings in detail, the sprinkler comprises a wheeled carriage A including a body casting 10 to the under side of which brackets 11 and 12, respectively, are secured, the latter having swiveled thereto a guide or steering wheel 13 while journaled in the bracket 11 are the traction wheels 14. Formed with the body 10 and rising therefrom at its top are spaced uprights 15 to which are fixed legged supports 16 having the bearings 17 for horizontally arranged axles 18 which are separated from each other.

Suitably fixed to the axles 18 are the arms 19 carrying an upwardly arched tube-like sprinkler head 20 which at its upper side has formed therewith spaced outwardly directed perforated spraying nipples 21, one end of the head being fitted with a removable screw plug 22 for convenience in the cleaning of said head.

Built upon the body casting is a water motor housing 23 in which is located a bladed water motor wheel 24, its center axle 25 being suitably journaled in said housing 23 while formed in the body casting 10 are the water inlet and outlet passages 26 and 27, respectively, these opening into the housing 23 at diametrically opposite points with respect to the motor wheel 24 therein. The passage 26 has fitted therein a coupling 28 for a rubber hose 29 while the passage 27 has fitted therein a coupling 30 for a rubber tube 31 which is fastened to a nipple 32 formed centrally on the head 20. Thus it will be seen that water fed from the hose 29 will operate the motor wheel 24 and thence flow therefrom through the tube 31 into the head 20 for sprinkling purposes. This head 20 during the sprinkling operation swings in an arc and such head is oscillated for the swinging strokes thereof in a manner presently described.

Built with the housing 23 is a gear casing 33 having arranged therein a train of reducing gears 34, these being connected with the motor wheel axle 25 and a driven tubular shaft 35, respectively. The shaft 35 has fixed thereto a crank 36 to which is connected a link 37, the same being also connected with a crank 38 fixed to one of the axles 18 so that when the motor wheel 24 is operating, the latter being driven from the water fed from the hose 29, the sprinkler head 20 will be oscillated in an arcuate path, the speed of movement of the head being regulated by the train of gearing 34, this being a reducing train for regulating a slower speed action of the head and the motor wheel 24.

The housing is equipped with lubricant cups 39 to enable the moving parts within the said housing 23 and the gear casing 34 to be lubricated.

The axle 25 for the motor wheel 24 at the end connected with the train of gearing 34 is formed with a screw driver slot 40 so that engagement of a screw driver can be had with this slot by the insertion of the screw driver through the tubular shaft 35 from without the sprinkler and the purpose of the use of the screw driver is to set the sprinkler head 20 in alignment with the perpendicular axis of the sprinkler when the water supply thereto has been cut off and the hose 29 disconnected so that this head 20 can be utilized as a handle for the carrying of the sprinkler in the hand of a user from one locality to another as the occasion may require or for the placing of the sprinkler in storage when not in use.

The hose 29 when connected with the sprinkler can be utilized for dragging the sprinkler over the lawn and such sprinkler will roll into the desired position by the caster and traction wheels 13 and 14, respectively, the pulling on the hose 29 in any direction will lead the sprinkler to the desired locality as may be necessary.

The pressure of the water upon the wheel 24 drives the same which operates as a water motor for oscillating the sprinkler head 20 of the sprinkler.

What is claimed is:

A sprinkler of the character described, comprising, a wheeled carriage having a body casting, bearings mounted on said casting, shafts rockable within said bearings, a tubular handle secured to said shafts above said bearings and formed with spray jets on one side and an inlet connection on another side, a water motor mounted on said casting, said casting formed with inlet and outlet water passages communicating with said motor, a flexible tubular member connecting said outlet passage to said inlet connection whereby water from said motor is discharged through said jets, trained gearing connected to said motor, and linkage connecting said gearing to one of said shafts whereby to rock said handle over said casting to vary the spraying area of the water discharged through said jets upon operation of said motor by water communicated from said inlet passage.

MARLEY NEEDLER.